US010949874B2

(12) United States Patent
Daly et al.

(10) Patent No.: US 10,949,874 B2
(45) Date of Patent: Mar. 16, 2021

(54) METHOD, APPARATUS, AND COMPUTER PROGRAM PRODUCT FOR PERFORMING A RULES-BASED DETERMINATION ON THE SUPPRESSION OF AN ELECTRONIC PRESENTATION OF AN ITEM

(71) Applicant: Groupon, Inc., Chicago, IL (US)

(72) Inventors: Mark Daly, San Francisco, CA (US); Xiaolei Li, Sunnyvale, CA (US)

(73) Assignee: Groupon, Inc., Chicago, IL (US)

( * ) Notice: Subject to any disclaimer, the term of this patent is extended or adjusted under 35 U.S.C. 154(b) by 204 days.

(21) Appl. No.: 15/018,011

(22) Filed: Feb. 8, 2016

(65) Prior Publication Data
US 2016/0155144 A1     Jun. 2, 2016

Related U.S. Application Data

(63) Continuation of application No. 13/839,786, filed on Mar. 15, 2013, now abandoned.

(51) Int. Cl.
*G06Q 30/02* (2012.01)
*H04W 4/021* (2018.01)

(52) U.S. Cl.
CPC ........ *G06Q 30/0246* (2013.01); *H04W 4/021* (2013.01)

(58) Field of Classification Search
CPC ................ G06Q 30/0246; H04W 4/021
USPC ......................................................... 705/319
See application file for complete search history.

(56) References Cited

U.S. PATENT DOCUMENTS

| 8,583,513 | B1 * | 11/2013 | Talreja | G06Q 30/08 705/14.4 |
|---|---|---|---|---|
| 9,665,556 | B1 * | 5/2017 | Sutariya | G06F 16/958 |
| 2009/0125380 | A1 * | 5/2009 | Otto | G06Q 10/087 705/7.29 |
| 2009/0150218 | A1 | 6/2009 | Brunner et al. | |
| 2009/0271266 | A1 | 10/2009 | Regmi et al. | |
| 2010/0318407 | A1 | 12/2010 | Leff et al. | |
| 2011/0231233 | A1 * | 9/2011 | Iannace | G06Q 30/0224 705/14.13 |

(Continued)

OTHER PUBLICATIONS

Closed Loop Retail Business Process for Targeted Offers (Year: 2007).*
Measuring Effects of Observational Learning and Social-Network Word-ofMouth (WOM) on the Sales of Daily-Deal Vouchers, Xitong Li, Lynn Wu (Year: 2013).*
Monetizing the Internet Surely There Must be Something other than Advertising, Eric K. Clemons (Year: 2009).*

(Continued)

Primary Examiner — Gautam Ubale
(74) Attorney, Agent, or Firm — Alston & Bird LLP

(57) ABSTRACT

Provided herein are systems, methods and computer readable media for determining whether to suppress presentation of a promotion from a promotion program in an electronic correspondence to a consumer. An example system may performing operations comprising receiving a set of promotions selected for presentation to the consumer in the electronic correspondence, each promotion respectively associated with a promotion score representing an estimated acceptance of the associated promotion by the consumer, determining, using a rules-based filter comprising a set of rules, whether to modify the promotion score, including geofencing data and the consumer's previous promotion purchasing history, in an instance in which the promotion score is modified, determining whether to suppress presentation of the promotion in the electronic correspondence based at least in part on the modified promotion score.

15 Claims, 5 Drawing Sheets

(56) References Cited

U.S. PATENT DOCUMENTS

| | | | |
|---|---|---|---|
| 2011/0231321 A1 | 9/2011 | Milne | |
| 2011/0313840 A1* | 12/2011 | Mason | G06O 30/0235 |
| | | | 705/14.35 |
| 2012/0166267 A1 | 6/2012 | Beatty et al. | |
| 2012/0278172 A1 | 11/2012 | Mercuri et al. | |
| 2012/0290389 A1* | 11/2012 | Greenough | G06Q 20/3224 |
| | | | 705/14.53 |
| 2013/0066719 A1* | 3/2013 | Kast | G06Q 30/02 |
| | | | 705/14.53 |
| 2013/0262195 A1* | 10/2013 | Newman | G06Q 30/0207 |
| | | | 705/14.1 |
| 2014/0019244 A1* | 1/2014 | Gundapaneni | G06Q 30/0611 |
| | | | 705/14.54 |
| 2014/0207544 A1* | 7/2014 | Mavinkurve | G06Q 30/0207 |
| | | | 705/14.13 |

OTHER PUBLICATIONS

The effect of network promotions on consumers' purchasing behaviors, Tang Shulei, Ren Licheng (Year: 2011).*
U.S. Appl. No. 13/411,502, filed Mar. 2, 2012; first named inventor: O'Brien.
U.S. Appl. No. 13/838,918, filed Mar. 15, 2013; first named inventor: O'Brien.
U.S. Appl. No. 61/613,476.
U.S. Appl. No. 61/644,352.
U.S. Appl. No. 61/663,508.
U.S. Appl. No. 61/675,769.
Office Action for U.S. Appl. No. 13/839,786 dated Mar. 2, 2015.

* cited by examiner

METHOD, APPARATUS, AND COMPUTER PROGRAM PRODUCT FOR PERFORMING A RULES-BASED DETERMINATION ON THE SUPPRESSION OF AN ELECTRONIC PRESENTATION OF AN ITEM

CROSS REFERENCE TO RELATED APPLICATIONS

This application is a continuation of and claims priority to U.S. non-provisional patent application Ser. No. 13/839,786, titled "PROMOTION SUPPRESSION SYSTEM" filed on Mar. 15, 2013 which is hereby incorporated by reference in its entirety.

FIELD OF THE INVENTION

The present description relates to offering promotions associated with a product or a service. This description more specifically relates to a process for predicting a consumer's reaction to a promotion offering, and determining whether or not to present the promotion offering.

DESCRIPTION OF THE RELATED ART

Merchants typically offer promotions to consumers from time to time in order to generate more business. The promotions offered may be in the form of discounts, deals, rewards or the like. However, not all promotions may be considered to be alike as each unique consumer may have unique tastes and likes such that different consumers may receive the same promotion with different levels of interest. Therefore, simply presenting consumers with promotions without any design behind the selection of promotions may not be effective.

SUMMARY OF THE INVENTION

Systems and methods for performing a rules-based determination on the suppression of an electronic presentation of an item are disclosed.

In some embodiments, a system made be provided, the system comprising one or more computers storing instructions that are operable, when executed by the one or more computers, to cause the one or more computers to implement determining whether to suppress presentation of a promotion from a promotion program in an electronic correspondence to a consumer by performing operations comprising receiving, from an analytical model, a set of promotions selected for presentation to the consumer in the electronic correspondence, the set of promotions including the promotion, wherein each of the set of promotions is respectively associated with a promotion score, wherein each promotion score represents an estimated acceptance of the associated promotion by the consumer, and wherein the magnitude of the score is correlated with a probability of an acceptance of the associated promotion by the consumer determining, using a rules-based filter comprising a set of rules, whether to modify the promotion score associated with the promotion, wherein the set of rules includes at least one of a first rule configured to filter out promotions associated with at least one promotion attribute for offering to consumers associated with at least one consumer attribute, a second rule configured to filter out at least one promotion for offering to a consumer based on the consumer's previous inputs to a promotion offering system, wherein the previous inputs include geofencing data, and a third rule configured to filter out at least one promotion for offering to a consumer based on the consumer's previous promotion purchasing history, and in an instance in which the promotion score is modified, and determining whether to suppress presentation of the promotion in the electronic correspondence based at least in part on the modified promotion score.

In some embodiments, modifying the promotion score comprises reducing the value of the promotion score, the reduced score value indicating a lower likelihood of acceptance of the promotion by the consumer.

In some embodiments, the reduced promotion score indicates no likelihood of acceptance of the promotion by the consumer.

In some embodiments, reducing the value of the promotion score comprises decreasing the promotion score by a predetermined amount.

In some embodiments, the promotion is assigned a particular position within the electronic correspondence, and determining whether to modify the promotion score associated with the promotion is based at least in part on the assigned position.

In some embodiments, the electronic correspondence includes a plurality of positions, wherein the set of promotions is ranked according to their associated scores, and wherein at least a subset of the promotions is each respectively assigned one of the positions based on the associated score.

In some embodiments, the second rule is based on explicit input from the consumer, the explicit input indicating a desire by the consumer not to be presented a potential promotion sharing a promotion attribute with the promotion.

In some embodiments, modifying the promotion score indicates reducing, but not eliminating, a possibility that the consumer will not be presented with the promotion.

In some embodiments, the promotion is described by promotion data describing promotion attributes including at least one of categories and subcategories, the consumer is described by consumer data describing consumer attributes including gender, and the first rule correlates categories or subcategories with gender.

In some embodiments, a system may be provided, the system comprising one or more computers storing instructions that are operable, when executed by the one or more computers, to cause the one or more computers to implement determining whether to suppress presentation of a promotion from a promotion program in an electronic correspondence to a consumer by performing operations comprising receiving, from a computer-implemented analytical model, a set of promotions selected for presentation to the consumer in the electronic correspondence, the set of promotions including the promotion, wherein each of the promotions is respectively associated with a promotion score, wherein each promotion score represents an estimated acceptance of the associated promotion by the consumer, wherein the estimated acceptance represents a predicted conversion rate, and wherein the magnitude of the score is correlated with a probability of an acceptance of the associated promotion by the consumer, receiving a minimum estimated acceptance threshold, the minimum estimated acceptance threshold representing a promotion score below which the presentation of a promotion in an electronic correspondence is suppressed, determining whether the promotion score associated with the promotion is less than the minimum estimated acceptance value, and suppressing presentation of the promotion in the electronic correspondence in an instance in which the promotion score associated with the promotion is less than the minimum estimated acceptance threshold.

In some embodiments, the electronic correspondence includes a plurality of positions, wherein the set of promotions is ranked according to their associated scores, wherein the promotion is assigned one of the plurality of positions, and wherein suppressing presentation of the promotion is based in part on the assigned position of the promotion.

In some embodiments, a computer program product, encoded on a non-transitory computer-readable medium may be provided, the computer program product comprising instructions operable to cause data processing apparatus to implement determining whether to suppress presentation of a promotion from a promotion program in an electronic correspondence to a consumer by performing operations comprising receiving, from a computer-implemented analytical model, a set of promotions selected for presentation to the consumer in the electronic correspondence, the set of promotions including the promotion, wherein each of the set of promotions is respectively associated with a promotion score, wherein each promotion score represents an estimated acceptance of the associated promotion by the consumer, wherein the estimated acceptance represents a predicted conversion rate, and wherein the magnitude of the score is correlated with a probability of an acceptance of the associated promotion by the consumer, determining, using a rules-based filter comprising a set of rules, whether to modify the promotion score associated with the promotion, wherein the set of rules includes at least one of a first rule configured to filter out promotions associated with at least one promotion attribute for offering to consumers associated with at least one consumer attribute, a second rule configured to filter out at least one promotion for offering to a consumer based on the consumer's previous inputs to a promotion offering system, wherein the previous inputs include geofencing data, and a third rule configured to filter out at least one promotion for offering to a consumer based on the consumer's previous promotion purchasing history, and in an instance in which the promotion score is modified, determining whether to suppress presentation of the promotion in the electronic correspondence based at least in part on the modified promotion score.

In some embodiments, modifying the promotion score comprises reducing the value of the promotion score, the reduced score value indicating a lower likelihood of acceptance of the promotion by the consumer.

In some embodiments, the reduced promotion score indicates no likelihood of acceptance of the promotion by the consumer.

In some embodiments, reducing the value of the promotion score comprises decreasing the promotion score by a predetermined amount.

In some embodiments, the promotion is assigned a particular position within the electronic correspondence, and wherein determining whether to modify the promotion score associated with the promotion is based at least in part on the assigned position.

In some embodiments, the electronic correspondence includes a plurality of positions, wherein the set of promotions is ranked according to their associated scores, and wherein at least a subset of the promotions is each respectively assigned one of the positions based on the associated score.

In some embodiments, the second rule is based on explicit input from the consumer, the explicit input indicating a desire by the consumer not to be presented a potential promotion sharing a promotion attribute with the promotion.

In some embodiments, modifying the promotion score indicates reducing, but not eliminating, a possibility that the consumer will not be presented with the promotion.

In some embodiments, the promotion is described by promotion data describing promotion attributes including at least one of categories and subcategories, wherein the consumer is described by consumer data describing consumer attributes including gender, and wherein the first rule correlates categories or subcategories with gender.

In some embodiments, a computer program product, encoded on a non-transitory computer-readable medium may be provided, the computer program product comprising instructions operable to cause data processing apparatus to implement determining whether to suppress presentation of a promotion from a promotion program in an electronic correspondence to a consumer by performing operations comprising receiving, from a computer-implemented analytical model, a set of promotions selected for presentation to the consumer in the electronic correspondence, the set of promotions including the promotion, wherein each of the promotions is respectively associated with a promotion score, wherein each promotion score represents an estimated acceptance of the associated promotion by the consumer, and wherein the magnitude of the score is correlated with a probability of an acceptance of the associated promotion by the consumer, receiving a minimum estimated acceptance threshold, the minimum estimated acceptance threshold representing a promotion score below which presentation of a promotion in an electronic correspondence is suppressed, determining whether the promotion score associated with the promotion is less than the minimum estimated acceptance threshold, and suppressing presentation of the promotion in the electronic correspondence in an instance in which the promotion score associated with the promotion is less than the minimum estimated acceptance value.

In some embodiments, the electronic correspondence includes a plurality of positions, wherein the set of promotions is ranked according to their associated scores, wherein the promotion is assigned one of the plurality of positions, and wherein suppressing presentation of the promotion is based in part on the assigned position of the promotion.

According to an aspect of the present invention, a method is provided for determining whether to present to a consumer a promotion from a promotion program in an electronic correspondence. The method includes: accessing, by a processor, a promotion attribute of the promotion; accessing, by the processor, a consumer profile for the consumer, the consumer profile including a consumer attribute; generating an estimated acceptance of the promotion by the consumer, the estimated acceptance being based on the promotion attribute and the consumer attribute; accessing one or more rules correlating one or more promotion attributes with one or more consumer attributes, the one or more rules indicative of suppressing presentation of a potential promotion that includes a promotion attribute to a potential consumer that has the correlated consumer attribute; determining whether the promotion attribute in the promotion and the consumer attribute of the consumer are correlated in the one or more rules; in response to determining that the promotion attribute in the promotion program and the consumer attribute of the consumer are correlated in the one or more rules, modifying the estimated acceptance of the promotion; and determining whether to present the promotion to the consumer based on the modified estimated acceptance.

According to another aspect of the present invention, a method is provided for determining whether to present to a consumer a promotion from a promotion program in an electronic correspondence. The method includes: accessing, by a processor, a promotion attribute of the promotion; accessing, by the processor, a consumer profile for the consumer, the consumer profile including a consumer attribute; generating an estimated acceptance of the promotion by the consumer, the estimated acceptance being based on the promotion attribute and the consumer attribute; accessing a minimum estimated acceptance, the minimum estimated acceptance indicative of an acceptance below which the promotion is suppressed; determining whether the estimated acceptance is less than the minimum estimated acceptance; and in response to determining that the estimated acceptance is less than the minimum estimated acceptance, eliminating a possibility that the promotion is presented to the consumer.

According to yet another aspect, a system is disclosed for determining whether to present to a consumer a promotion from a promotion program in an electronic correspondence. The system includes: a memory storing processor-executable instructions; and a processor in communication with the memory. The processor is configured to execute the processor-executable instructions to: access a promotion attribute of the promotion; accessing a consumer profile for the consumer, the consumer profile including a consumer attribute; generate an estimated acceptance of the promotion by the consumer, the estimated acceptance being based on the promotion attribute and the consumer attribute; access one or more rules correlating one or more promotion attributes with one or more consumer attributes, the one or more rules indicative of suppressing presentation of a potential promotion that includes a promotion attribute to a potential consumer that has the correlated consumer attribute; determine whether the promotion attribute in the promotion and the consumer attribute of the consumer are correlated in the one or more rules; in response to determining that the promotion attribute in the promotion program and the consumer attribute of the consumer are correlated in the one or more rules, modify the estimated acceptance of the promotion; and determine whether to present the promotion to the consumer based on the modified estimated acceptance.

According to still another aspect, a system is disclosed for determining whether to present to a consumer a promotion from a promotion program in an electronic correspondence. The system includes: a memory storing processor-executable instructions; and a processor in communication with the memory. The processor is configured to execute the processor-executable instructions to: access a promotion attribute of the promotion; access a consumer profile for the consumer, the consumer profile including a consumer attribute; generate an estimated acceptance of the promotion by the consumer, the estimated acceptance being based on the promotion attribute and the consumer attribute; access a minimum estimated acceptance, the minimum estimated acceptance indicative of an acceptance below which the promotion is suppressed; determine whether the estimated acceptance is less than the minimum estimated acceptance; and in response to determining that the estimated acceptance is less than the minimum estimated acceptance, eliminate a possibility that the promotion is presented to the consumer.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Figure 1:
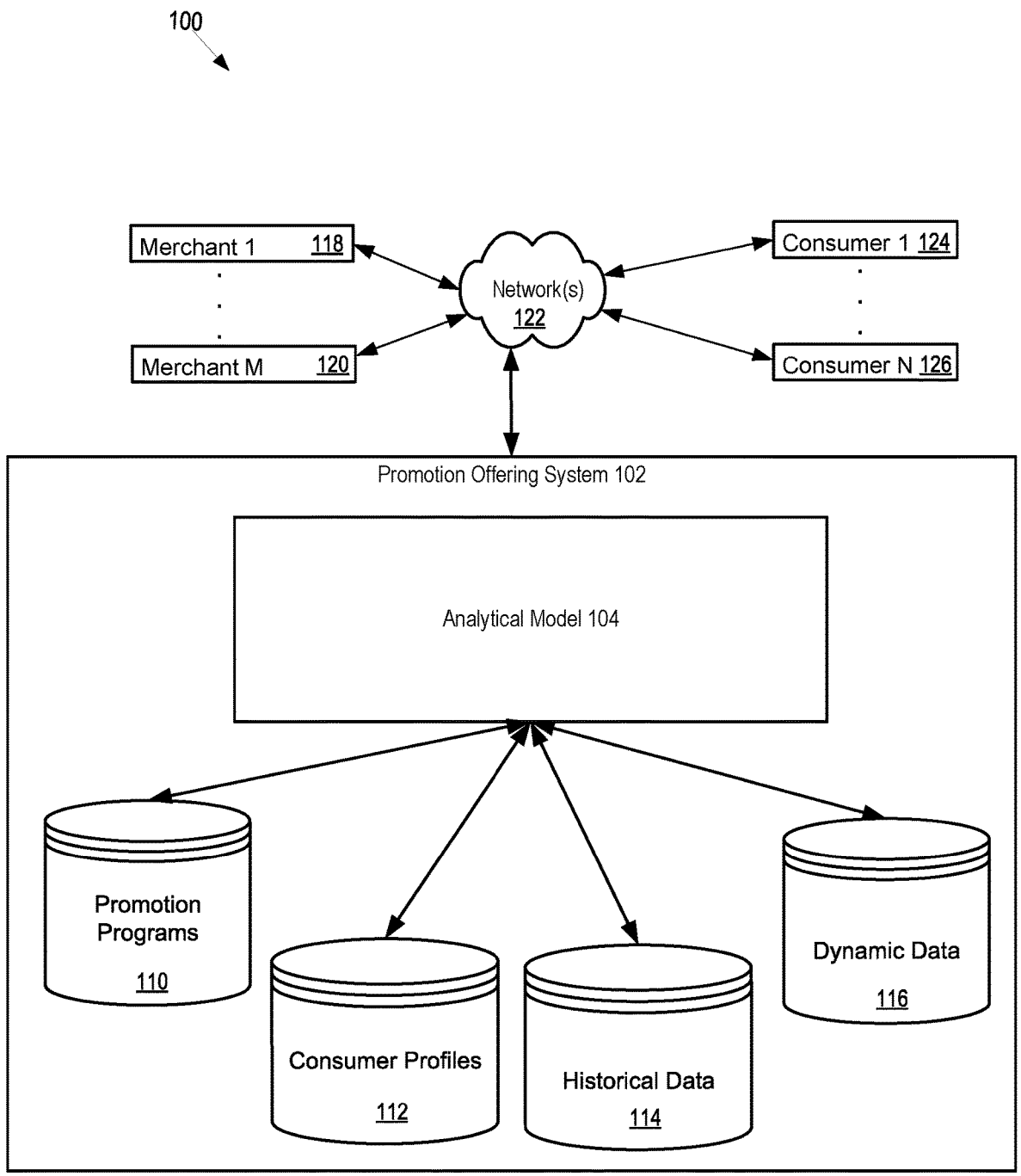
FIG. 1 illustrates a representation of a network and a plurality of devices that interact with the network to achieve an analysis of how previous presentations of a promotion may effect a consumer.

A promotion offering system 102, as illustrated in FIG. 1 may offer one or more promotions to a consumer at a given time, or at multiple times throughout a set time period. When multiple promotions are offered to the consumer, the promotion offering system 102 may offer groups of promotions in the form of promotion collections (such as offering 3 or more promotions selected from a promotion collection in a single electronic correspondence). Examples of promotion collections may include, without limitation, local promotions (e.g., promotions that are geographically proximate to the consumer), short term exclusive promotions, travel themed promotions, specific goods promotions (e.g., electronics, beauty products, sports goods, etc.), service deals, activity deals and holiday themed promotions. In this way, the promotion offering system 102 may determine which promotion(s), or group(s) of promotions, to offer to a consumer. Examples of grouping promotions into promotion collections are disclosed in U.S. Provisional Patent Application No. 61/663,508, incorporated by reference in its entirety. Going forward, all subsequent mention of a promotion may be interchangeable with a promotion collection.

The one or more promotions that are offered to the consumer may be presented to the consumer in an electronic correspondence. The electronic correspondence may take the form of an email, SMS text message, webpage inbox message, VOIP voice message, real-time webpage content presentation, mobile push notifications or other similar types of electronic correspondences where information is "pushed" onto a consumer.

In this way, the promotion offering system 102 may generate an electronic correspondence to include one or more promotions, which will then be presented to a specific consumer by, for example, being transmitted to the specific consumer.

A promotion may include any type of reward, discount, coupon, credit, deal, voucher or the like used toward part (or all) of the purchase of a product or a service. The promotion may be offered to a consumer, by a merchant, as part of a larger promotion program, or the promotion may be offered as a stand-alone one-time promotion.

In an effort to better distinguish and identify the promotion, the promotion may include one or more promotion attributes, such as identifying the merchant offering the promotion (e.g., "XYZ coffee shop), the location of the promotion, the amount of the promotion, the category of the promotion (such as a restaurant promotion, a spa promotion, a travel promotion, a local promotion, etc.), the subcategory of the promotion (such as a sushi restaurant), amount of discount offered by the promotion, or the like.

Category/subcategory is one example of a type of taxonomy or classification in order to describe the promotion program. In one embodiment, the categories/subcategories include at least two levels, one level defining categories and a sub-level defining the subcategories. An alternate embodiment includes a hierarchy of 3 levels including category, subcategory, and sub-subcategory. One example of the category spa, the subcategory massage, and the sub-subcategory divided into massage types (e.g., Reiki, Back-Neck Massage, Full Body Massage, Foot Massage, and Facial Massage). Alternatively, other types of taxonomy or classification may be used, such as a single layer taxonomy without multiple levels.

Likewise, the electronic correspondence may have one or more attributes associated with it. For example, the electronic correspondence may include attributes identifying a position within the electronic correspondence where a promotion is assigned to be located, a look or design theme of the electronic correspondence, a time of day the electronic correspondence is presented to the consumer, or the like. It should be noted that promotions and deals are recited in this disclosure to be understood as being interchangeable, unless specifically stated otherwise.

Also, the consumer to whom the electronic correspondence is presented may be associated with certain consumer attributes. The consumer attributes may include, but are not limited to, identifying the consumer's age, gender, location, previous purchasing history, promotions that are liked by the consumer, promotions that the consumer is interested in receiving, or the like. Further, attributes based on both the consumer and the promotion program may be generated, such as the consumer's distance from the promotion (e.g., the distance between the consumer's location, such as the consumer's home, and the place of business of the promotion program) or geographic direction (e.g. north, south, east, west) of the consumer from the location of the promotion. The consumer's attributes may be stored as part of a consumer profile generated for the consumer, as described in more detail later in this disclosure.

The electronic correspondence may be tailored to the intended recipient, by including promotions that have been selected based on one or more attributes of the consumer. For instance, one or more attributes of the consumer may be used to generate an estimate of acceptance by the consumer of the promotion. The estimated acceptance may be manifested in an assigned score. The highest scoring promotions may be selected for inclusion in the electronic correspondence to the consumer. The present disclosure contemplates determining the estimated acceptance and/or a promotion score according to one or more of the methods disclosed in U.S. patent application Ser. No. 13/411,502 and U.S. Provisional Patent Application No. 61/644,352, both of which are incorporated by reference herein in their entirety. In addition, the calculated promotion score may be further adjusted to consider whether the promotion (e.g., either the exact same promotion or another promotion with a similar attribute) was previously presented to the specific consumer. Presenting the promotion to the consumer may have an impact on the consumer's behavior for a subsequent presentation of the same (or similar) promotion. Therefore, the promotion score may be adjusted to consider whether the promotion (e.g., either the exact same promotion or another promotion with a similar attribute) was previously presented to the specific consumer, as disclosed in U.S. Provisional Patent Application No. 61/675,769, the entirety of which is incorporated by reference herein. Other methods of selecting the promotion(s) for inclusion in the electronic correspondence are also contemplated.

Based on its promotion score, the promotion may be selected for inclusion in the electronic correspondence if the promotion score surpasses an inclusion threshold. This selection process may be applied across one or more promotions such that the electronic correspondence is generated to include one or more promotions whose promotion score surpasses the inclusion threshold.

Figure 2:
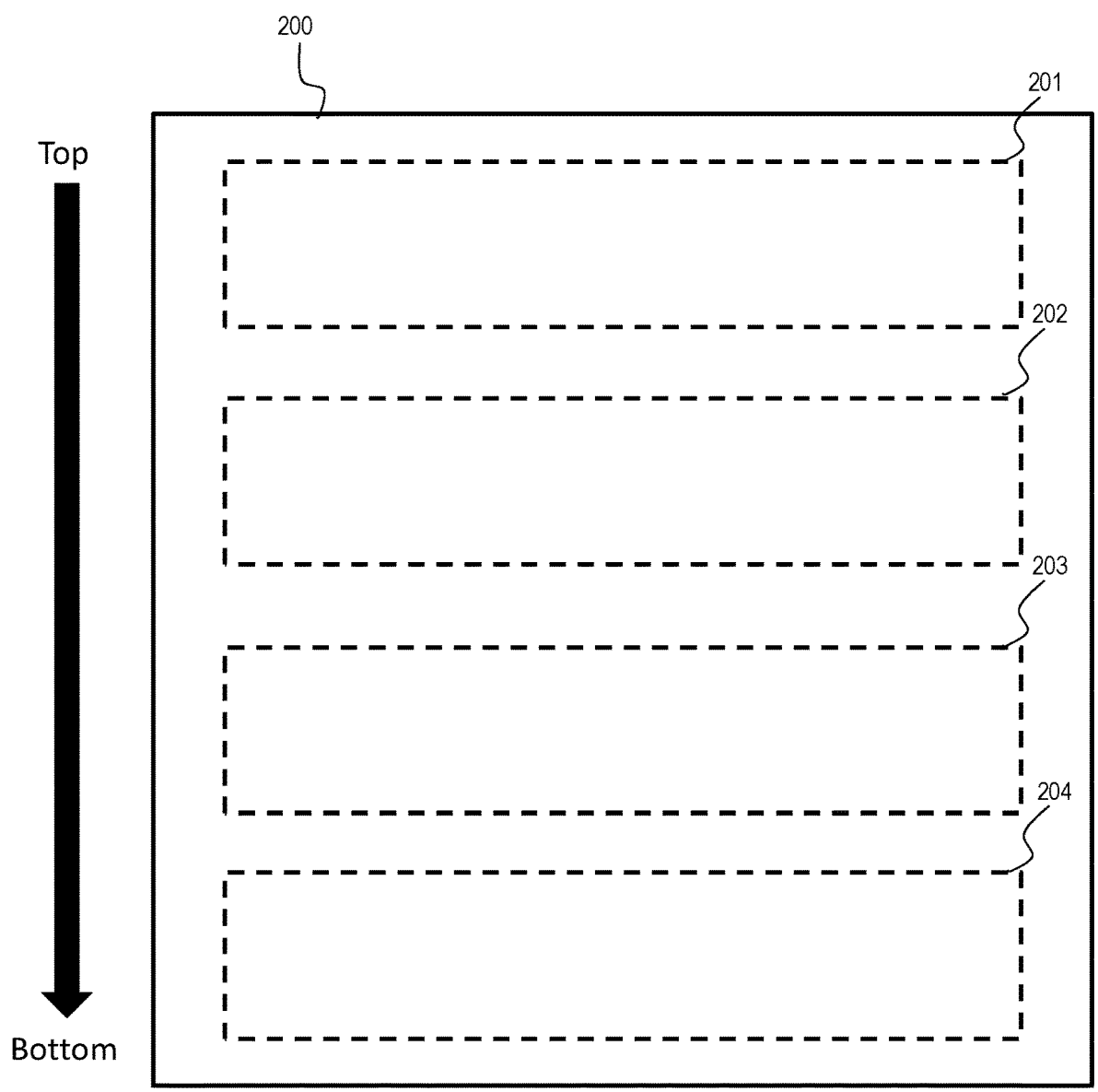
FIG. 2 illustrates an exemplary electronic correspondence that includes a plurality of positions for presenting promotions to a consumer, according to the present invention.

The electronic correspondence itself may be formatted to comprise one or more set positions for displaying each of the promotions selected for inclusion in the email. For example, FIG. 2 illustrates an exemplary electronic correspondence 200, where the electronic correspondence 200 includes a first position 201, second position 202, third position, 203, and a fourth position 204. The first position 201 is positioned to be at the top of the electronic correspondence 200. In addition, each position within the electronic correspondence may be assigned a level of desirability value. For example, positions that are closer to the top of the electronic correspondence may be assigned a higher level of desirability than positions that are lower down on the email. So for the electronic correspondence 200 in FIG. 2, the first position 201 is assigned the highest level of desirability value, the fourth position 204 is assigned the lowest level of desirability value, and the remaining second position 202 and third position 203 will have level of desirability values in between in a descending order, respectively. This is because there is presumably a higher likelihood that a consumer will view a promotion displayed at the top of the electronic correspondence compared to a promotion positioned at the bottom of the electronic correspondence.

In order to take advantage of more desirable positions within the electronic correspondence, promotions that have a higher promotion score (which is indicative of a conversion rate or probability of a consumer purchasing the promotion) may be assigned to positions that have higher levels of desirability. For instance, the promotion with the highest promotion score may be assigned the position with the highest level of desirability at the top of the electronic correspondence (e.g., the first position 201). Conversely, the promotion with the lowest promotion score may be assigned the position with the lowest level of desirability (e.g., the fourth position 204).

A promotion suppression functionality may be used as part of the process of determining whether to present a promotion to a consumer. In one embodiment, the promotion suppression functionality may comprise a rules-based filter in which, depending on one or more factors, may reduce or eliminate the possibility of presenting the promotion to the consumer. The promotion suppression functionality may comprise one or more rules that correlate one or more promotion attributes with one or more consumer attributes. The rules may be used to suppress the presentation of a promotion that includes a promotion attribute to a customer that has the correlated consumer attribute, as discussed in more detail below. Suppressing the presentation of the promotion may include reducing the possibility that the promotion may be presented to the consumer (e.g., eliminating the possibility of presenting the promotion to the consumer or reducing, but not eliminating, the possibility of presenting the promotion to the consumer). The rules in the promotion suppression functionality may be applied dependent on which position the promotion is assigned in the electronic correspondence (e.g., the rules may be applied to positions of lower desirability but not applied to positions of higher desirability).

The rules in the promotion suppression functionality may be generated in one of several ways. One way is based on consumer input. As one example, the consumer may provide explicit input indicating a promotion attribute that the consumer desires not to receive. More specifically, the consumer may manually input that he or she does not desire to receive promotions that are assigned a certain category and/or subcategory. The manual input may be in the form of a "thumbs down" for a particular type of promotion. As discussed in more detail below, in one embodiment, the promotion suppression functionality may reduce, but not eliminate, the possibility of receiving a promotion with a promotion attribute, even if the consumer has submitted explicit input indicating a desire not to receive promotions with the promotion attribute.

As another example, the consumer may provide implicit input indicating a promotion attribute that the consumer desires not to receive. The implicit input may comprise feedback the customer provides relating to promotions that include the promotion attribute. More specifically, the implicit input may comprise, in response to the consumer being presented with an email including the promotion with the promotion attribute: a refusal to open an email that includes the promotion; refusal to clink on a link to access a webpage describing the promotion; and/or refusal to purchase the promotion.

Another way to generate the rules in the promotion suppression functionality is empirically. Feedback data from consumer reactions to previous offers of promotions may be used to empirically determine which promotions with particular promotion attributes are more or less suited to consumers with particular consumer attributes. As discussed in more detail below, one or more rules may correlate gender attributes with corresponding promotion attributes. More specifically, the rules may comprise correlating the male attribute or the female attribute to associated categories and/or sub-categories that consumers with the ascribed gender attribute do not typically purchase.

In an alternate embodiment, the promotion suppression functionality may comprise determining whether the estimated acceptance is greater or less than a minimum acceptance threshold. In the event that the estimated acceptance by the consumer is below the minimum acceptance threshold, the possibility of presenting the promotion to the consumer may be eliminated. The promotion suspension functionality may be applied dependent on the assigned position of the promotion in the email (e.g., the determination whether the estimated acceptance is greater or less than a minimum acceptance threshold may be applied to positions of lower desirability but not applied to positions of higher desirability).

FIG. 1 illustrates an overview for a promotion system 100 configured to offer promotions for promotion programs. The promotion system 100 includes a promotion offering system 102. The promotion offering system 102 is configured to communicate with consumers, such as consumer 1 (124) to consumer N (126), via the one or more network(s) 122. The promotion offering system 102 is also configured to communicate with merchants, such as merchant 1 (118) to merchant M (120), via the one or more network(s) 122.

The promotion offering system 102 also includes an analytical model 104 that is in communication with databases 110, 112, 114, 116. The analytical model 104 may include one or more components for analyzing the promotions and determining which promotions to present to the consumer. For example, the analytical model 104 may include one or more components for scoring the promotion, such that the analytical model 104 may select promotions for inclusion in an electronic correspondence based on a promotion score. The scoring calculation process may be implemented by the analytical model 104 according to one or more of the scoring methods described above. For example, the promotion score calculated by the analytical model 104 may be calculated to be based on, at least in part, a probability the consumer will accept the promotion, such that promotions that are determined to have a higher probability of being accepted by the consumer may be factored in to calculate a higher promotion score. As another example, the promotion score calculated by the analytical model 104 may be calculated to be based on, at least in part, a probability the consumer will purchase the promotion, such that promotions that are determined to have a higher probability of being purchased by the consumer may be factored in to calculate a higher promotion score. As another example, the promotion score calculated by the analytical model 104 may be calculated to be based on, at least in part, an expected profit value for the promotion if the promotion is offered and purchased by the consumer, such that promotions that are determined to have a higher expected profit value may be factored in to calculate a higher promotion score.

The analytical model 104 may further include one or more components for generating electronic correspondences to include one or more promotions that have been analyzed, and assigning a position within the electronic correspondence to each of the included promotions. Further description is provided later in this disclosure.

The analytical model 104 may also include one or more components for implementing the rules-based filter for making a final determination on whether to remove a promotion from the electronic correspondence or keep the promotion in the electronic correspondence. Further description is provided later in this disclosure.

To generate promotion scores, the analytical model 104 communicates with multiple databases that are part of (or work in conjunction with) the promotion offering system 102 such as a promotion programs database 110, consumer profiles database 112, historical data database 114 and dynamic data database 116. With respect to the particular consumer, the analytical model 104 may access the databases 110, 112, 114 and 116 in order to obtain specific attribute information on the particular consumer and the various promotions in the promotion system 100. As described throughout this disclosure, various attributes may be associated or assigned to a promotion and a consumer in the promotion system 100. The obtained attribute information may then be utilized to generate promotion scores for each promotion with respect to the particular consumer. The promotion score may be calculated to represent an indication of the probability that the particular consumer will accept an offer from a respective promotion.

The promotion programs database 110 is configured to store data detailing various promotions and promotion programs that are available for offer by the promotion offering system 102. In order to input promotion program information into the promotions program database 110, merchants may communicate with the promotion offering system 102 via the one or more network(s) 122 to input the information detailing the various promotion program offerings. The merchant's promotions may then be stored on the promotion programs database 110.

The consumer profiles database 112 includes profiles for the consumers, consumer 1 (124) to consumer N (126), that are included in the promotion system 100. The consumer attribute information describing attributes for the one or more consumers within the promotion system 100 may include, but is not limited to, name, age, address, occupation, educational background, previously accepted promotion program offerings, previously rejected promotion program offerings, gender and the like. One or more of the consumer attributes may be utilized by the promotion offering system 102 in determining the promotion score. One or more of the consumer attributes may also be utilized by the promotion offering system 102 during other analyses for determining whether to include the promotion within an electronic correspondence to be presented to a consumer.

The historical data database 114 includes information detailing the past performance of promotion offerings that have been presented in the promotion offering system 102 in previous times. The historical data database 114 may include, but is not limited to, information describing rates of acceptances of specific promotion programs, attributes of consumers that accepted or rejected specific promotion programs, and the like.

The dynamic data database 116 includes information detailing the past performance of a promotion program offering that is currently active in the promotion offering system 102. In this way, a promotion stored in the promotion programs database 110 may be currently active, while data stored in the dynamic data database 116 may pertain to performance data for promotions offered during a previous time period.

Although FIG. 1 has been illustrated to show separate databases 110, 112, 114 and 116, it is contemplated that databases 110, 112, 114 and 116 may be arranged in any combination of one or more memories/storage units.

Figure 3:
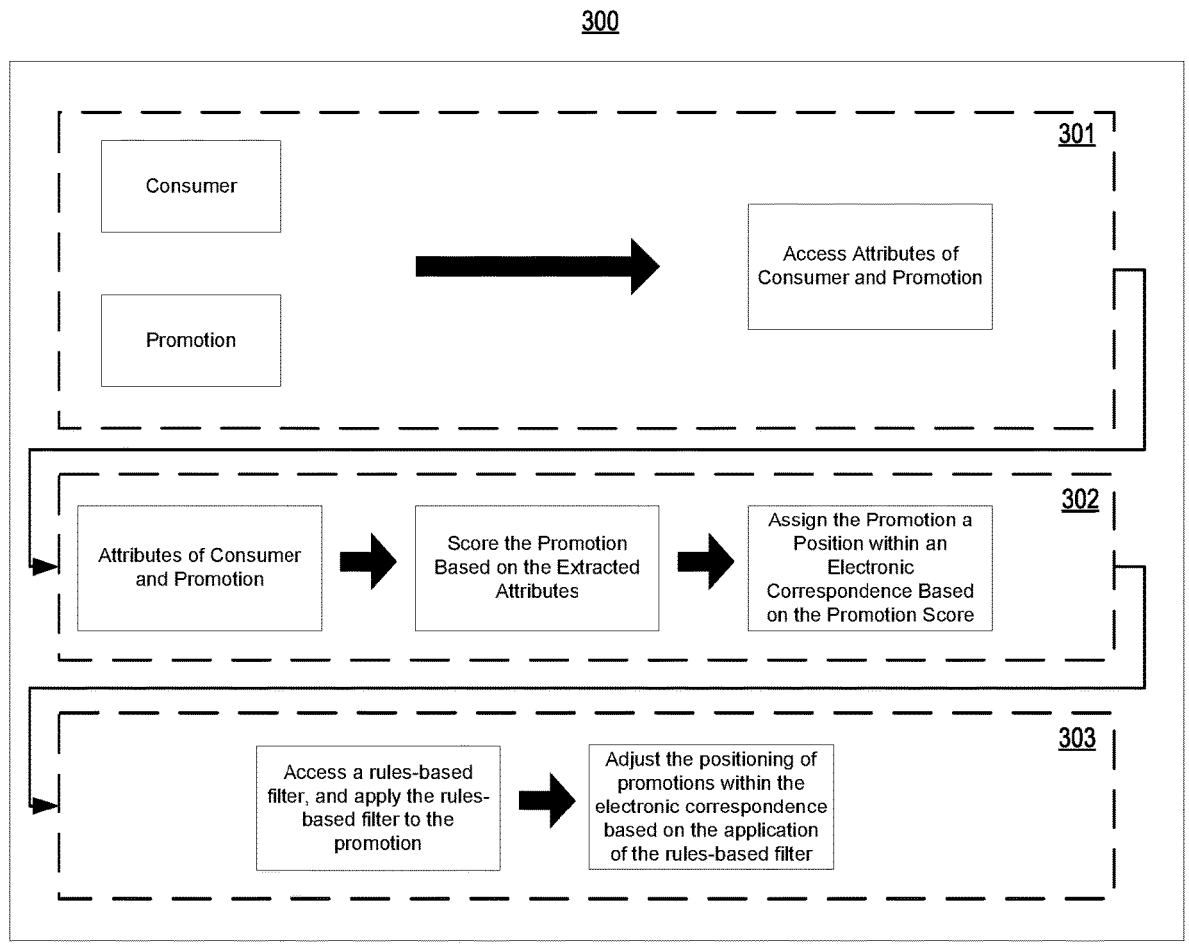
FIG. 3 illustrates a flow chart describing an overview of a process for extracting attributes of a consumer and a promotion, assigning the promotion to a position within an electronic correspondence based on a score of the promotion, and applying a rules-based filter, according to the present invention.

FIG. 3 illustrates a flow diagram 300 describing an overview of a process for selecting one or more promotions for inclusion in an electronic correspondence to be presented to a consumer. The process described in flow chart 300 includes calculating a promotion score for a promotion, and assigning the promotion to a position within the electronic correspondence based on the promotion score. Further description is provided below.

At 301, the process selects the consumer that will be receiving the electronic correspondence. In addition, the process selects a promotion that will be considered for inclusion in the electronic correspondence. In addition or alternatively, one or more promotions may be selected for consideration in parallel. After selecting the consumer and the promotion, respective attributes of both the consumer and promotion may be accessed. Examples of consumer attributes and promotion attributes, which are not exhaustive, are provided throughout this description. Further, attributes derived from one or both of the consumer and promotion attributes may be generated. For example, a distance of the consumer from the promotion location may be generated using the location attribute of the consumer and the location attribute of the promotion.

At 302, the accessed consumer attributes and promotion attributes are referenced in order to calculate a promotion score for the promotion. The promotion score may be calculated according to one or more of the methods described above that are based, at least in part, on the consumer attributes and promotion attributes. The promotion score is one example of an indication of estimated acceptance that the consumer will purchase the promotion if presented with the promotion offer. Once the promotion score is calculated, the promotion may be assigned to a position within the electronic correspondence. The promotion's assigned position within the electronic correspondence may be based on an analysis comparing the promotion score to promotion scores for other promotions that have been selected for inclusion in the electronic correspondence. As described above, each position within the electronic correspondence may be assigned a level of desirability value. Based on the comparison, the promotions selected for inclusion in the electronic correspondence, that includes the current promotion, may be arranged in an order according to their respective promotion score. For example, the promotion with the highest promotion score may be positioned into a position with the highest level of desirability value, the promotion with the second highest promotion score may be positioned into a position with the second highest level of desirability value, and so on. Further description of positioning promotions within an electronic correspondence based on promotion scores and level of desirability values is also provided above.

In addition to that described above, the promotion score may meet or exceed an inclusion threshold value in order for the promotion to be included in the electronic correspondence. Therefore, 302 may additionally include a process for comparing the promotion score with the inclusion threshold value. If the promotion score does not at least meet the inclusion threshold value, then the promotion may be excluded from the electronic correspondence at 302.

After the processes described in 302, according to some embodiments, the electronic correspondence may be presented to the consumer. For example, a set number of promotions with the highest promotion scores may be arranged into the electronic correspondence at 302, and then transmitted to the consumer for the consumer to view. Optionally, promotions having a promotion score that at least meets the inclusion threshold may be arranged into the electronic correspondence at 302, and then transmitted to the consumer for the consumer to view. However, in other embodiments, the process may include an additional layer of processing for determining whether to include the promotion in the electronic correspondence before presentation to the consumer. Further description of this additional process is provided below with reference to 303.

At 303, a rules-based filter may be accessed. The rules-based filter may comprise one implementation of the promotion suppression functionality. Alternatively, the promotion suppression functionality may comprise determining whether the estimated acceptance is greater or less than a minimum acceptance threshold.

The rules-based filter may apply one or more rules that affects the determination whether to include the promotion in the electronic correspondence for presentation to the consumer. For example, if a rule from the rules-based filter is implicated, the promotion may be eliminated from consideration. As another example, if a rule from the rules-based filter is implicated, the estimated acceptance associated with the promotion may be lessened, but not reduced to zero. In this regard, the promotion is still available for consideration whether to be presented to the consumer.

The rules may state that consumers with certain consumer attribute(s) are not to receive (or are less likely to receive) promotions with certain promotion attribute(s). As discussed above, the rules may manifest explicit or implicit input of the consumer. In this way, the rules-based filter serves to remove the promotion from the electronic correspondence (or reduce the likelihood of including the promotion in the electronic correspondence) if the promotion and the consumer are found to implicate one or the rules in the rules-based filter.

If the promotion is removed from the electronic correspondence based on the rules-based filter, then promotions that may have been positioned below it may be brought up to occupy the empty position in the same order they were arranged at 302.

In some embodiments, the rules-based filter may only be applied to promotions that are positioned at specific positions within the electronic correspondence. For example, the rules-based filter may only be applied to a promotion that is positioned at the top position within the electronic correspondence that corresponds to the highest level of desirability. In other embodiments, the rules-based filter may be applied only to one or more subsequent promotions at one or more subsequent positions within the electronic correspondence.

In the event that the promotion is removed from consideration, the ranking of the promotions may be updated. In this regard, if the promotion is removed from the electronic correspondence based on the rules-based filter, then promotions that may have been positioned below it may be brought up to occupy the empty position in the same order they were arranged at 302. The electronic correspondence may then be presented to the consumer after the processes described in 303.

FIG. 3 illustrates that the promotion suppression functionality is applied at or near the end of the series of decisions whether to present a promotion to a consumer. Additional steps in the decision process include, but are not limited to, business rule application (e.g., potential reordering of promotions to meet certain business needs) and balancing (e.g., shuffling rankings to meet desired feature placement constraints). Balancing is discussed in U.S. application Ser. No. 13/411,502, in U.S. Provisional Application No. 61/613,476, and in U.S. application Ser. No. 13/838,918 entitled "Deal Allocation Platform", each of which is incorporated by reference herein in its entirety. For example, in balancing, if it is desired that 500,000 people receive the promotion offer, and the algorithm only selects 400,000 consumers to receive the offer, the algorithm may be modified (such as the thresholds to issue a promotion offer, or a re-ranking of deals) in order to issue the deal to the 500,000 consumers.

The promotion suppression functionality may be applied after various steps in the decision process for several reasons. First, suppressing a promotion prior to full consideration may be inappropriate, particularly given that the suppression in one embodiment reduces (but does not eliminate) the possibility of sending the promotion to the user. To that end, promotions that have a very large chance of acceptance may still be sent to the consumer, even if the promotion suppression functionality is applied. Second, applying the promotion suppression functionality before balancing may deny the opportunity for a merchant to receive sufficient exposure for a promotion. Third, in one embodiment, the promotion suppression functionality is dependent on position of the promotion in the electronic correspondence. Thus, the determination as to the promotions to present and the corresponding positions for the promotions may first be determined.

Figure 4:
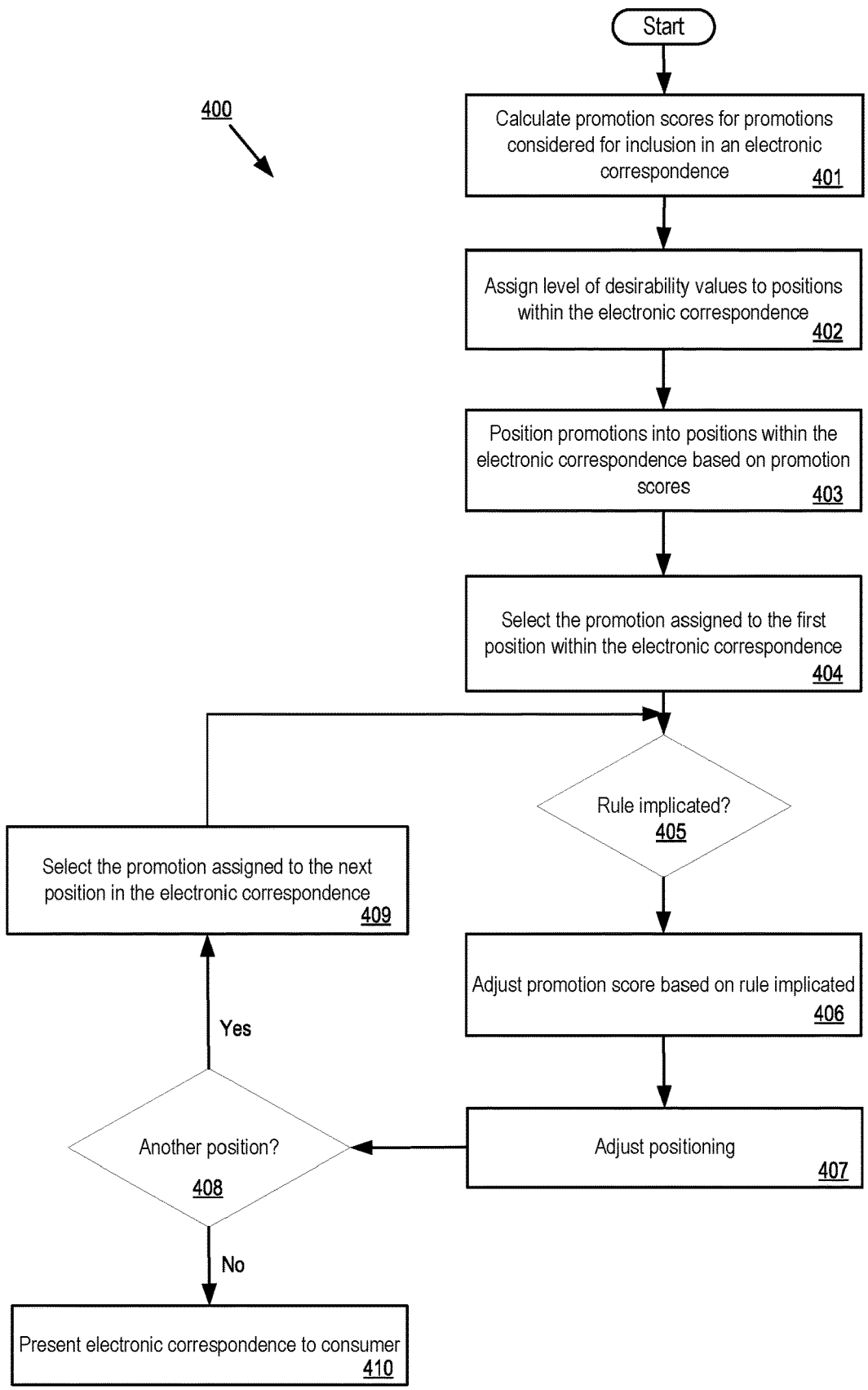
FIG. 4 illustrates flow chart describing a process for applying a rules-based filter, according to the present invention.

Further description of the rules-based filter is provided with reference to flow chart 400 illustrated in FIG. 4. FIG. 4 illustrates a flow chart 400 that describes a process for calculating promotion scores for promotions that are considered for inclusion in an electronic correspondence, positioning the promotions based on their respective promotion scores, and applying a rules-based filter for determining whether to remove a promotion from the electronic correspondence.

At 401, promotion scores for one or more promotions that are considered for inclusion in the electronic correspondence are calculated. The promotion scores may be calculated according to one or more of the scoring methods described above. For example, all of the currently available promotions within the promotion offering system 102 as stored in the promotion programs database 110 may initially be considered for inclusion in the electronic correspondence. In some embodiments, promotions with promotion scores less than an inclusion threshold value may be excluded from consideration for inclusion in the electronic correspondence.

At 402, one or more positions within the electronic correspondence may be assigned a level of desirability value, as described above. For example, positions in the electronic correspondence that are considered to be more desirable (e.g., at the top of the electronic correspondence where the consumer is more likely to view a promotion), will be assigned a higher level of desirability value than positions that are considered to be less desirable (e.g., positions at the bottom of the electronic correspondence where a user may not reach for viewing).

At 403, promotions may be positioned into positions within the electronic correspondence based on, at least in part, promotion scores and level of desirability values as described above.

At 404, the promotion assigned to the first position within the electronic correspondence may be selected. At 405, it is determined whether a rule in the rule-based filter is implicated. As discussed above, the rules may be applied independently of, or dependent on, the position of the promotion in the electronic correspondence. If the rule is implicated, the effect of the rule may be applied. For example, at 406, the promotion score may be adjusted based on the rule implicated. Adjustment of the promotion score may comprise reducing the score by a predetermined amount, a predetermined percentage, or the like. As discussed above, the promotion score is one example of an estimated acceptance by the consumer. In this regard, adjusting the estimated acceptance may comprise reducing the estimated acceptance by a predetermined amount (e.g., reduce by 0.05 so that it is 5% less likely that the system estimates that the consumer will accept the promotion), a predetermined percentage (e.g., reduce by 10% of the estimated acceptance), or the like. Alternatively, the adjustment of the promotion score may comprise reducing the score so that the reduction effectively eliminates the promotion from consideration. In the context of the estimated acceptance, the estimated acceptance may be adjusted to zero.

The rules-based filter may comprise one or more rules for determining whether to adjust the promotion score associated with the promotion. For example, a first rule may state that certain types of consumers are not to receive (or are less likely to receive) certain types of promotions. In this way, if the promotion is found to implicate this first rule, the promotion score associated with the promotion may be adjusted (e.g., the promotion score may be reduced by a predetermined amount or may be reduced to zero). The types of consumers may be identified based on the consumer's consumer attributes, as described above. Similarly, the types of promotions may be identified based on the promotion attributes, as described above. In this way, the first rule may identify certain types of consumers that will not receive certain types of promotions or are less likely to receive the certain types of promotions.

For instance, the first rule may state that a male consumer should not receive beauty related promotions. The first rule may also state that female consumers should not receive laser tag outing promotions. The examples of specific rules are provided for illustrative purposes only, as other rules may apply.

Further, a second rule may recite that the consumer should not receive (or is less likely to receive) certain promotions based on the consumer's past inputs. In this way, if the promotion is found to implicate this second rule, the promotion may be removed from the electronic correspondence. The consumer's past input may be a previous input by the consumer that indicates whether the consumer likes, or dislikes, certain promotions. The consumer's past input may also be a previous input by the consumer that indicates whether the consumer wishes to receive certain types of promotions in the future. In either case, the promotions may be identified according to the promotion attributes.

For example, if the consumer has previously indicated that the consumer does not like a certain promotion (e.g., an Italian restaurant promotion), one or more of the disliked promotion attributes may be saved by the rules-based filter. The rules-based filter may then generate the second rule to state that the consumer should not receive promotions (or should be less likely to receive promotions) that include the one or more saved promotion attributes. So that, if the consumer previously indicated that the consumer does not like an Italian restaurant promotion, the rules-based filter may prevent the consumer from receiving Italian restaurant promotions by removing Italian restaurant promotions from the electronic correspondence at 406. Alternatively, if the consumer previously indicated that the consumer does not like an Italian restaurant promotion, the rules-based filter may reduce the likelihood (but not eliminate the possibility) that the consumer receives Italian restaurant promotions at 406.

As another example, if the consumer has previously identified certain promotion attributes that the consumer is not interested in, these promotion attributes may be saved by the rules-based filter such that the second rule is generated to state that the consumer should not receive promotions (or is less likely to receive promotions) that include the one or more saved promotion attributes. In this regard, if the consumer previously identified restaurant promotions and promotions located more than 5 miles away as promotion attributes the consumer is not interested in, the rules-based filter may prevent the consumer from receiving restaurant promotions and promotions located more than 5 miles from the consumer by removing such promotions from the electronic correspondence at 406. Alternatively, if the consumer previously identified restaurant promotions and promotions located more than 5 miles away as promotion attributes the consumer is not interested in, the rules-based filter may reduce the likelihood of the consumer receiving restaurant promotions and promotions located more than 5 miles from the consumer by reducing the estimated acceptance (e.g., reducing the score) associated with promotions that meet this criteria.

Further, a third rule may state that the consumer should not (or should be less likely to) receive certain promotions based on the consumer's past promotion purchasing history. The consumer's past purchasing history may be obtained, for example, from the historical data database 114. The consumer's past purchasing history may identify certain promotions, and corresponding promotion attributes, that the consumer has historically not had an interest in purchasing. The rules-based filter may reference the consumer's past purchasing history and identify promotions that fall below a set purchasing threshold as being promotions, and corresponding promotion attributes, that the consumer is not interested in purchasing.

For example, the rules-based filter may reference the consumer's past purchasing history and identify that the consumer has not purchased any travel promotions in the past six months, which falls below a set purchasing threshold. Therefore, the rules-based filter may save this information in the form of the third rule by stating that the consumer will not receive (or will be less likely to receive) travel promotions. The rules provided above are not exhaustive, as other rules may be included as part of the rules-based filter.

At 407, the position of the promotions is adjusted based on the adjusted promotion score. For example, in the event that a promotion score for a specific promotion is adjusted, the position associated with the specific promotion may be adjusted as well. At 408, a determination is made as to whether there is another position in the electronic correspondence. If so, the promotion assigned to the next position in the electronic correspondence is selected at 409. However, if not, the electronic correspondence will be presented to the consumer at 410.

Figure 5:
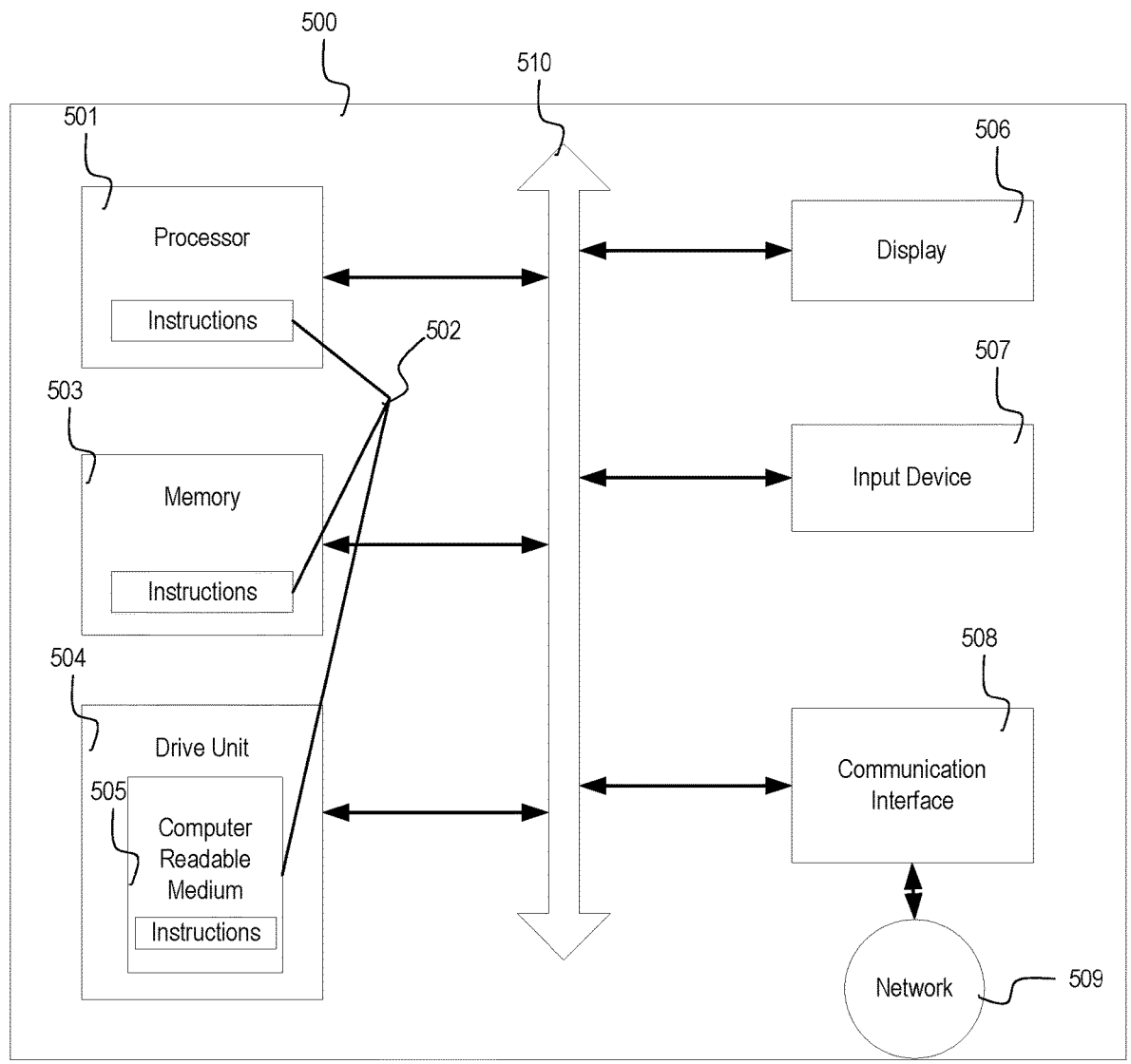
FIG. 5 illustrates a general computer system, programmable to be a specific computer system, which may represent any of the computing devices referenced herein.

FIG. 5 illustrates a general computer system 500, programmable to be a specific computer system 500, which can represent any server, computer or component, such as consumer 1 (124), consumer N (126), merchant 1 (118), merchant M (120), and promotion offering system 102. The computer system 500 may include an ordered listing of a set of instructions 502 that may be executed to cause the computer system 500 to perform any one or more of the methods or computer-based functions disclosed herein. The computer system 500 can operate as a stand-alone device or can be connected, e.g., using the network 122, to other computer systems or peripheral devices.

In a networked deployment, the computer system 500 can operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile computing device capable of executing a set of instructions 502 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 500 can include a memory 503 on a bus 510 for communicating information. Code operable to cause the computer system to perform any of the acts or operations described herein can be stored in the memory 503. The memory 503 may be a random-access memory, read-only memory, programmable memory, hard disk drive or any other type of volatile or non-volatile memory or storage device.

The computer system 500 can include a processor 501, such as a central processing unit (CPU) and/or a graphics processing unit (GPU). The processor 501 may include one or more general processors, digital signal processors, application specific integrated circuits, field programmable gate arrays, digital circuits, optical circuits, analog circuits, combinations thereof, or other now known or later-developed devices for analyzing and processing data. The processor 501 may implement the set of instructions 502 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 500 can also include a disk or optical drive unit 504. The disk drive unit 504 may include a computer-readable medium 505 in which one or more sets of instructions 502, e.g., software, may be embedded. Further, the instructions 502 may perform one or more of the operations as described herein. The instructions 502 may reside completely, or at least partially, within the memory 503 or within the processor 501 during execution by the computer system 500. Accordingly, the databases 110, 112, 114, or 116 may be stored in the memory 503 or the disk unit 504.

The memory 503 and the processor 501 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 500 may include an input device 507, such as a keyboard or mouse, configured for a user to interact with any of the components of system 500. It may further include a display 506, such as a liquid crystal display (LCD), a cathode ray tube (CRT), or any other display suitable for conveying information. The display 506 may act as an interface for the user to see the functioning of the processor 501, or specifically as an interface with the software stored in the memory 503 or the drive unit 504.

The computer system 500 may include a communication interface 508 that enables communications via the communications network 122. The network 122 may include wired networks, wireless networks, or combinations thereof. The communication interface 508 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion offering system 102, as depicted in FIG. 1 may comprise one computer system or multiple computer systems. Further, the flow diagrams illustrated in the Figures may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system, comprising:
   a promotion offering system comprising a processor and a non-transitory computer-readable medium storing instructions that are operable, when executed by the processor, to cause the promotion offering system to implement determining whether to suppress presentation of a promotion from a promotion program in an electronic correspondence to a consumer by performing operations comprising a rules-based system for determining whether or not to present the promotion offering to the consumer based on rules-based filtering, the operations comprising:
   receiving, from an analytical model, a set of promotions selected for presentation to the consumer in the electronic correspondence, the set of promotions including the promotion, wherein each promotion of the set of promotions is respectively associated with a promotion score,
   wherein each promotion score represents an estimated acceptance of the associated promotion by the consumer, and the estimated acceptance represents a predicted conversion rate, and each promotion score is calculated based on at least, in part, one or more of i) a probability the consumer will purchase the associated promotion, ii) an expected profit value for the associated promotion if the associated promotion is offered and purchased by the consumer, and iii) a probability of an acceptance of the associated promotion by the consumer, and the promotion score is further determined, in part, using i) attributes of the consumer which are stored as part of a consumer profile generated for the consumer and including at least a location attribute of the consumer based on a determined distance between a location of the consumer as accessed from the consumer profile and ii) a location attribute of each promotion of the set of promotions including a location identified for each promotion of the set of promotions;
   wherein the electronic correspondence includes a plurality of positions and the set of promotions is ranked according to their associated promotion scores, and wherein at least a subset of the promotions is respectively assigned one of the positions based on the associated promotion score representing the estimated acceptance of the associated promotion by the consumer;
   determining, using a rules-based filter comprising a set of rules, whether to modify the promotion score associated with the promotion, wherein the set of rules includes:
   a first rule configured to filter out promotions associated with at least one promotion attribute for offering to consumers associated with at least one consumer attribute,
   a second rule configured to filter out at least one promotion for offering to the consumer based on the consumer's previous inputs to a promotion offering system, wherein the second rule is based on manual explicit input from the consumer, the explicit input being a thumbs down indicating a desire by the consumer not to be presented a potential promotion sharing a promotion attribute with the promotion; wherein modifying the promotion score indicates reducing, but not eliminating, a possibility that the consumer will not be presented with the promotion, and
   a third rule configured to filter out at least one promotion for offering to the consumer based on the consumer's previous promotion purchasing history;
   in response to determining to modify the promotion score associated with the promotion, modifying the promotion score associated with the promotion;
   in an instance in which the promotion score is modified, determining whether to suppress presentation of the promotion in the electronic correspondence based at least in part on the modified promotion score; and
   generating the electronic correspondence, which is at least one of an email, text message, voice message, webpage inbox message, real-time webpage content presentation and mobile push notification, for electronic presentation on a device of the consumer to include one or more promotions having an associated promotion score satisfying an inclusion threshold value based on a comparison of the associated promotion score with the inclusion threshold value and the associated promotion score meeting or exceeding the inclusion threshold value, wherein the electronic correspondence is formatted to comprise one or more set positions for displaying each of the one or more promotions selected for inclusion in the electronic correspondence, wherein the one or more promotions are each assigned to a position within the electronic correspondence based on a comparison of the promotion scores selected for inclusion in the electronic correspondence, wherein the promotion of the one or more promotions with a highest promotion score is assigned to a first position located at a top of the electronic correspondence, and the promotion of the one or more promotions with a lowest promotion score is assigned to a last position located at a bottom of the electronic correspondence.

2. The system of claim 1, wherein modifying the promotion score comprises reducing a value of the promotion score, the reduced value of the promotion score indicating a lower likelihood of acceptance of the promotion by the consumer.

3. The system of claim 2, wherein the reduced value of the promotion score indicates no likelihood of acceptance of the promotion by the consumer.

4. The system of claim 2, wherein reducing the value of the promotion score comprises decreasing the value of the promotion score by a predetermined amount.

5. The system of claim 1, wherein the promotion is assigned a particular position within the electronic correspondence; and
  determining whether to modify the promotion score associated with the promotion is based at least in part on the assigned position.

6. The system of claim 1, wherein the promotion is described by promotion data describing promotion attributes including at least one of categories and subcategories;
  wherein the consumer is described by consumer data describing consumer attributes including gender; and
  wherein the first rule correlates categories or subcategories with gender.

7. A system, comprising:
  a promotion offering system comprising a processor and a non-transitory computer-readable medium storing instructions that are operable, when executed by the processor, to cause the promotion offering system to implement determining whether to suppress presentation of a promotion from a promotion program in an electronic correspondence to a consumer by performing operations comprising a rules-based system for determining whether or not to present the promotion offering to the consumer based on rules-based filtering, the operations comprising:
  receiving, from a computer-implemented analytical model, a set of promotions selected for presentation to the consumer in the electronic correspondence, the set of promotions including the promotion, wherein each promotion of the set of promotions is respectively associated with a promotion score, wherein each promotion score represents an estimated acceptance of the associated promotion by the consumer, and the estimated acceptance represents a predicted conversion rate, and each promotion score is calculated based on at least, in part, one or more of i) a probability the consumer will purchase the associated promotion, ii) an expected profit value for the associated promotion if the associated promotion is offered and purchased by the consumer, and iii) a probability of an acceptance of the associated promotion by the consumer, and the promotion score is further determined, in part, using i) attributes of the consumer which are stored as part of a consumer profile generated for the consumer and including at least a location attribute of the consumer based on a determined distance between a location of the consumer as accessed from the consumer profile and ii) a location attribute of each promotion of the set of promotions including a location identified for each promotion of the set of promotions; wherein the electronic correspondence includes a plurality of positions and the set of promotions is ranked according to their associated promotion scores, and wherein at least a subset of the promotions is respectively assigned one of the positions based on the associated promotion score representing the estimated acceptance of the associated promotion by the consumer;
  receiving a minimum estimated acceptance threshold, the minimum estimated acceptance threshold representing a promotion score below which the presentation of a promotion in an electronic correspondence is suppressed;
  modifying the promotion score associated with the promotion based on a rules-based filter comprising a set of rules; wherein the set of rules includes:
    a first rule configured to filter out promotions associated with at least one promotion attribute for offering to consumers associated with at least one consumer attribute,
    a second rule configured to filter out at least one promotion for offering to the consumer based on the consumer's previous inputs to a promotion offering system, wherein the second rule is based on manual explicit input from the consumer, the explicit input being a thumbs down indicating a desire by the consumer not to be presented a potential promotion sharing a promotion attribute with the promotion; and wherein modifying the promotion score indicates reducing, but not eliminating, a possibility that the consumer will not be presented with the promotion; and
    a third rule configured to filter out at least one promotion for offering to the consumer based on the consumer's previous promotion purchasing history;
  determining whether the modified promotion score associated with the promotion is less than the minimum estimated acceptance threshold;
  suppressing presentation of the promotion in the electronic correspondence in an instance in which the modified promotion score associated with the promotion is less than the minimum estimated acceptance threshold; and
  generating the electronic correspondence, which is at least one of an email, text message, voice message, webpage inbox message, real-time webpage content presentation and mobile push notification, for electronic presentation on a device of the consumer to include one or more promotions having an associated promotion score satisfying an inclusion threshold value based on a comparison of the associated promotion score with the inclusion threshold value and the associated promotion score meeting or exceeding the inclusion threshold value, wherein the electronic correspondence is formatted to comprise one or more set positions for displaying each of the one or more promotions selected for inclusion in the electronic correspondence, wherein the one or more promotions are each assigned to a position within the electronic correspondence based on a comparison of the promotion scores selected for inclusion in the electronic correspondence, wherein the promotion of the one or more promotions with a highest promotion score is assigned to a first position located at a top of the electronic correspondence, and the promotion of the one or more promotions with a lowest promotion score is assigned to a last position located at a bottom of the electronic correspondence.

8. A computer program product, encoded on a non-transitory computer-readable medium, the computer program product comprising instructions operable to cause a promotion offering system to implement determining whether to suppress presentation of a promotion from a promotion program in an electronic correspondence to a consumer by performing operations comprising a rules-based system for determining whether or not to present the promotion offering to the consumer based on rules-based filtering, the operations comprising:

receiving, from a computer-implemented analytical model, a set of promotions selected for presentation to the consumer in the electronic correspondence, the set of promotions including the promotion, wherein each promotion of the set of promotions is respectively associated with a promotion score, wherein each promotion score represents an estimated acceptance of the associated promotion by the consumer, and the estimated acceptance represents a predicted conversion rate, and each promotion score is calculated based on at least, in part, one or more of i) a probability the consumer will purchase the associated promotion, ii) an expected profit value for the associated promotion if the associated promotion is offered and purchased by the consumer, and iii) a probability of an acceptance of the associated promotion by the consumer, and the promotion score is further determined, in part, using i) attributes of the consumer which are stored as part of a consumer profile generated for the consumer and including at least a location attribute of the consumer based on a determined distance between a location of the consumer as accessed from the consumer profile and ii) a location attribute of each promotion of the set of promotions including a location identified for each promotion of the set of promotions; wherein the electronic correspondence includes a plurality of positions and the set of promotions is ranked according to their associated promotion scores, and wherein at least a subset of the promotions is respectively assigned one of the positions based on the associated promotion score representing the estimated acceptance of the associated promotion by the consumer;

determining, using a rules-based filter comprising a set of rules, whether to modify the promotion score associated with the promotion, wherein the set of rules includes
a first rule configured to filter out promotions associated with at least one promotion attribute for offering to consumers associated with at least one consumer attribute,
a second rule configured to filter out at least one promotion for offering to the consumer based on the consumer's previous inputs to a promotion offering system, wherein the second rule is based on manual explicit input from the consumer, the explicit input being a thumbs down indicating a desire by the consumer not to be presented a potential promotion sharing a promotion attribute with the promotion; wherein modifying the promotion score indicates reducing, but not eliminating, a possibility that the consumer will not be presented with the promotion, and
a third rule configured to filter out at least one promotion for offering to the consumer based on the consumer's previous promotion purchasing history;

in response to determining to modify the promotion score associated with the promotion, modifying the promotion score associated with the promotion;

in an instance in which the promotion score is modified, determining whether to suppress presentation of the promotion in the electronic correspondence based at least in part on the modified promotion score; and generating the electronic correspondence, which is at least one of an email, text message, voice message, webpage inbox message, real-time webpage content presentation and mobile push notification, for electronic presentation on a device of the consumer to include one or more promotions having an associated promotion score satisfying an inclusion threshold value based on a comparison of the associated promotion score with the inclusion threshold value and the associated promotion score meeting or exceeding the inclusion threshold value, wherein the electronic correspondence is formatted to comprise one or more set positions for displaying each of the one or more promotions selected for inclusion in the electronic correspondence, wherein the one or more promotions are each assigned to a position within the electronic correspondence based on a comparison of the promotion scores selected for inclusion in the electronic correspondence, wherein the promotion of the one or more promotions with a highest promotion score is assigned to a first position located at a top of the electronic correspondence, and the promotion of the one or more promotions with a lowest promotion score is assigned to a last position located at a bottom of the electronic correspondence.

9. The computer program product of claim 8, wherein modifying the promotion score comprises reducing a value of the promotion score, the reduced score value indicating a lower likelihood of acceptance of the promotion by the consumer.

10. The computer program product of claim 9, wherein the reduced value of the promotion score indicates no likelihood of acceptance of the promotion by the consumer.

11. The computer program product of claim 9, wherein reducing the value of the promotion score comprises decreasing the promotion score by a predetermined amount.

12. The computer program product of claim 8, wherein the promotion is assigned a particular position within the electronic correspondence, and wherein determining whether to modify the promotion score associated with the promotion is based at least in part on the assigned position.

13. The computer program product of claim 8, wherein the promotion is described by promotion data describing promotion attributes including at least one of categories and subcategories; wherein the consumer is described by consumer data describing consumer attributes including gender; and wherein the first rule correlates categories or subcategories with gender.

14. A computer program product, encoded on a non-transitory computer-readable medium, the computer program product comprising instructions operable to cause promotion offering system to implement determining whether to suppress presentation of a promotion from a promotion program in an electronic correspondence to a consumer by performing operations comprising a rules-based system for determining whether or not to present the promotion offering to the consumer based on rules-based filtering, the operations comprising:

receiving, from a computer-implemented analytical model, a set of promotions selected for presentation to the consumer in the electronic correspondence, the set of promotions including the promotion, wherein each promotion of the set of promotions is respectively associated with a promotion score, wherein each promotion score represents an estimated acceptance of the associated promotion by the consumer, and the estimated acceptance represents a predicted conversion rate, and each promotion score is calculated based on at least, in part, one or more of i) a probability the consumer will purchase the associated promotion, ii) an expected profit value for the associated promotion if the associated promotion is offered and purchased by the consumer, and iii) a probability of an acceptance of the associated promotion by the consumer, and the promotion score is further determined, in part, using i) attributes of the consumer which are stored as part of a consumer profile generated for the consumer and including at least a location attribute of the consumer based on a determined distance between a location of the consumer as accessed from the consumer profile and ii) a location attribute of each promotion of the set of promotions including a location identified for each promotion of the set of promotions; wherein the electronic correspondence includes a plurality of positions and the set of promotions is ranked according to their associated promotion scores, and wherein at least a subset of the promotions is respectively assigned one of the positions based on the associated promotion score representing the estimated acceptance of the associated promotion by the consumer;

receiving a minimum estimated acceptance threshold, the minimum estimated acceptance threshold representing a promotion score below which presentation of a promotion in an electronic correspondence is suppressed;

modifying the promotion score associated with the promotion based on a rules-based filter comprising a set of rules; wherein the set of rules includes:
  a first rule configured to filter out promotions associated with at least one promotion attribute for offering to consumers associated with at least one consumer attribute, and
  a second rule configured to filter out at least one promotion for offering to the consumer based on the consumer's previous inputs to a promotion offering system, wherein the second rule is based on manual explicit input from the consumer, the explicit input being a thumbs down indicating a desire by the consumer not to be presented a potential promotion sharing a promotion attribute with the promotion; and wherein modifying the promotion score indicates reducing, but not eliminating, a possibility that the consumer will not be presented with the promotion; and
  a third rule configured to filter out at least one promotion for offering to the consumer based on the consumer's previous promotion purchasing history;

determining whether the modified promotion score associated with the promotion is less than the minimum estimated acceptance threshold;

suppressing presentation of the promotion in the electronic correspondence in an instance in which the modified promotion score associated with the promotion is less than the minimum estimated acceptance threshold; and generating the electronic correspondence, which is at least one of an email, text message, voice message, webpage inbox message, real-time webpage content presentation and mobile push notification, for electronic presentation on a device of the consumer to include one or more promotions having an associated promotion score satisfying an inclusion threshold value based on a comparison of the associated promotion score with the inclusion threshold value and the associated promotion score meeting or exceeding the inclusion threshold value, wherein the electronic correspondence is formatted to comprise one or more set positions for displaying each of the one or more promotions selected for inclusion in the electronic correspondence, wherein the one or more promotions are each assigned to a position within the electronic correspondence based on a comparison of the promotion scores selected for inclusion in the electronic correspondence, wherein the promotion of the one or more promotions with a highest promotion score is assigned to a first position located at a top of the electronic correspondence, and the promotion of the one or more promotions with a lowest promotion score is assigned to a last position located at a bottom of the electronic correspondence.

15. The system of claim 1, wherein when the instructions are further executed by the processor, such further instructions cause the promotion offering system to:
  determine that the locations associated with the set of promotions are geographically proximate to the consumer location.

* * * * *